(12) United States Patent
Rohwedder

(10) Patent No.: US 7,677,606 B2
(45) Date of Patent: Mar. 16, 2010

(54) CONNECTOR FOR AN ARTICULATED CONNECTION OF A FIRST AND SECOND PIPELINE

(75) Inventor: Horst-Dieter Rohwedder, Stuhr (DE)

(73) Assignee: Airbus Deutschland GmbH (DE)

( * ) Notice: Subject to any disclaimer, the term of this patent is extended or adjusted under 35 U.S.C. 154(b) by 88 days.

(21) Appl. No.: 11/920,104

(22) PCT Filed: May 26, 2006

(86) PCT No.: PCT/EP2006/005055

§ 371 (c)(1),
(2), (4) Date: Nov. 8, 2007

(87) PCT Pub. No.: WO2006/125666

PCT Pub. Date: Nov. 30, 2006

(65) Prior Publication Data

US 2009/0103973 A1    Apr. 23, 2009

(30) Foreign Application Priority Data

May 27, 2005    (DE) .................. 10 2005 024 413

(51) Int. Cl.
*F16L 27/04*    (2006.01)
(52) U.S. Cl. ...................... 285/262; 285/226
(58) Field of Classification Search ........... 285/226, 285/262, 261, 223, 191
See application file for complete search history.

(56) References Cited

U.S. PATENT DOCUMENTS

| | | | | |
|---|---|---|---|---|
| 373,072 A * | 11/1887 | Jarvis | .......................... | 285/262 |
| 386,547 A * | 7/1888 | Martin | ........................ | 285/262 |
| 955,927 A * | 4/1910 | Vincent | ....................... | 285/262 |
| 979,513 A * | 12/1910 | Koenig | ......................... | 285/262 |
| 994,471 A * | 6/1911 | Koenig | ........................ | 285/262 |
| 1,674,130 A * | 6/1928 | Russell et al. | ................ | 285/262 |
| 1,886,332 A | 11/1932 | Flavin | | |
| 2,807,480 A * | 9/1957 | Oliver et al. | ................. | 285/262 |
| 2,813,731 A * | 11/1957 | Tracy et al. | .................. | 285/262 |
| 2,824,758 A * | 2/1958 | Cattrell | ........................ | 285/262 |
| 2,921,803 A * | 1/1960 | Tracy | .......................... | 285/262 |
| 6,871,882 B2 * | 3/2005 | Challender et al. | .......... | 285/261 |
| 886,061 A1 | 9/2007 | Phillips, Jr. | | |

(Continued)

FOREIGN PATENT DOCUMENTS

DE    1 213 448 A    3/1966

(Continued)

*Primary Examiner*—David E Bochna
(74) *Attorney, Agent, or Firm*—Lerner, David, Littenberg, Krumholz & Mentlik, LLP

(57) ABSTRACT

A connector with an additional tolerance compensation capacity for articulately connecting a first and second pipeline of an engine-powered hot air supply system in an aircraft. One pipe end of the first pipeline is articulately connected by a tie rod with a pipe end of the second pipeline with the formation of a gap. The pipe ends each include a bearing ring incorporating an essentially centrically arranged receptacle for attaching the tie rod. The receptacle is connected with a bearing ring inner surface by at least two braces pointing radially outward. The opposing pipe ends are enveloped by a sealing unit for sealing the gap. A first end of the tie rod includes an adjusting unit in the form of a screw-on ball head for length adjustment while the second end includes a fixed ball head.

13 Claims, 2 Drawing Sheets

U.S. PATENT DOCUMENTS

| | | | |
|---|---|---|---|
| 7,503,590 B2 * | 3/2009 | Challender et al. ......... 285/261 |
| 2004/0032123 A1 | 2/2004 | Chu | |

FOREIGN PATENT DOCUMENTS

| | | |
|---|---|---|
| DE | 1 425 478 A | 2/1969 |
| DE | 93 10 505.3 U1 | 9/1993 |
| EP | 0 936 392 A2 | 8/1999 |
| GB | 740427 A | 11/1955 |
| GB | 807336 A | 1/1959 |

* cited by examiner

CONNECTOR FOR AN ARTICULATED CONNECTION OF A FIRST AND SECOND PIPELINE

CROSS-REFERENCE TO RELATED APPLICATIONS

This application is a national phase entry under 35 U.S.C. §371 of International Application No. PCT/EP 2006/005055 filed May 26, 2006 which claims priority from German Patent Application No. 10 2005 024 413.0 filed May 27, 2005, the disclosures of which are all hereby incorporated herein by reference.

BACKGROUND OF THE INVENTION

The invention relates to a connector for articulately connecting a first and second pipeline, in particular a first and second pipeline of an engine-powered hot air supply system in an aircraft, with an additional tolerance compensation capacity, wherein one pipe end of the first pipeline is articulately connected by a tie rod with a pipe end of the second pipeline with the formation of a gap.

Known embodiments of connectors for articulately connecting pipelines used to relay fluids and/or gaseous substances with a high temperature and/or a high pressure, in particular hot gases or the like, have sealing organs fitted with metal sealing cuffs and plastic materials for establishing the actual seal, for example. For example, such pipelines are used in aircraft for engine startup systems, air-conditioning the passenger compartment, and deicing the wings and aerodynamic control surfaces.

Due to the encountered high temperatures of the fluids or gases, additional vibrations as well as relative movements of the pipe ends relative to each other that arise during operation, these plastic materials that establish the actual seal wear relatively quickly.

In particular in areas of relevance in terms of safety, e.g., when connecting the pipelines of an engine-powered hot-air supply system in aircraft, the signs of wear described above on known connectors necessitate a high maintenance outlay given the short inspection intervals.

In addition, known connectors are difficult to assemble, since control units are arranged in the area of a gap between the pipe ends to be connected to perform the tolerance compensation.

An object of the invention is to avoid the disadvantages of the known embodiments of connectors described above.

BRIEF SUMMARY OF THE INVENTION

The object is achieved by a device having the features set forth herein.

The fact that the opposing pipe ends are enveloped by a sealing unit, in particular a metal bellows, for sealing the gap, and a first end of the tie rod has an adjusting unit for length adjustment in general provides the connector according to the invention with nearly lifelong durability, wherein the adjusting unit situated on the side facilitates assembly at the same time. Further, it enables nearly maintenance free operation over the entire life of the connector according to the invention, even in safety-relevant areas, e.g., connecting pipelines of an engine-powered hot-air supply system in an aircraft or the like.

In another embodiment of the invention, the pipe ends each have a bearing ring incorporating an essentially centrally arranged receptacle for attaching the tie rod, wherein the receptacle is connected with a bearing ring inner face by at least two braces pointing radially outward.

This provides for an essentially central receptacle for the tie rod in the pipe ends, enabling a largely uniform transfer of force between the first and second pipeline.

In another exemplary embodiment, the braces are spaced uniformly apart.

This embodiment essentially enables a uniform conveyance of the forces to be transferred from the receptacles to the bearing rings.

In another exemplary embodiment, the receptacles incorporate bearing shells, the dome-shaped openings of which each point in the direction of an interior space of the first and second pipeline.

The bearing shells incorporating the dome-shaped openings in conjunction with the ball heads arranged on either side of the tie rod enable an articulately connecting of the pipe ends.

In another exemplary embodiment, the first pipeline and/or the second pipeline is designed to be disconnectable in the area of the bearing ring by a connector, in particular a V-flange joint.

This simplifies assembly of the connector, since the separability of the first pipeline improves accessibility to the adjusting unit situated on the edge.

In another exemplary embodiment, the bearing shells and receptacles each have boreholes for passing through the tie rod.

When the pipeline is pressurized, the pipe ends are pulled apart in the area of the connector, wherein this tensile force is conveyed from the bearing shells arranged in the receptacles to the ball heads at the ends of the tie rod. Due to the receptacles, the effect of the tensile force is converted into a compressive force, so that the bearing shells in the receptacles are essentially only exposed to compressive forces. This yields an overall very high loading capacity for the connector according to the invention during the pressurization of the pipeline.

In addition, the domes in the receptacles interact with the ball heads to enable tolerance compensation in a direction essentially transverse to the longitudinal axis of the first and second pipeline.

In another exemplary embodiment, the tie rod comprises a screw-on ball head as the adjusting unit at the first end, and a fixed ball head at the second end.

If necessary, the screw-on ball head is used to adjust the length of the tie rod, and hence effect tolerance compensation in the direction of the longitudinal axis of the first and second pipeline. Since the screw-on ball head is relatively easy to access in the area of the first receptacle of the first bearing ring depending on the length of the first pipeline, tolerance compensation can be easily effected by the connector according to the invention.

Additional advantageous embodiments of the connector according to the invention are disclosed in the further claims.

BRIEF DESCRIPTION OF THE DRAWINGS

The drawings show.

DETAILED DESCRIPTION OF THE INVENTION

Figure 1:
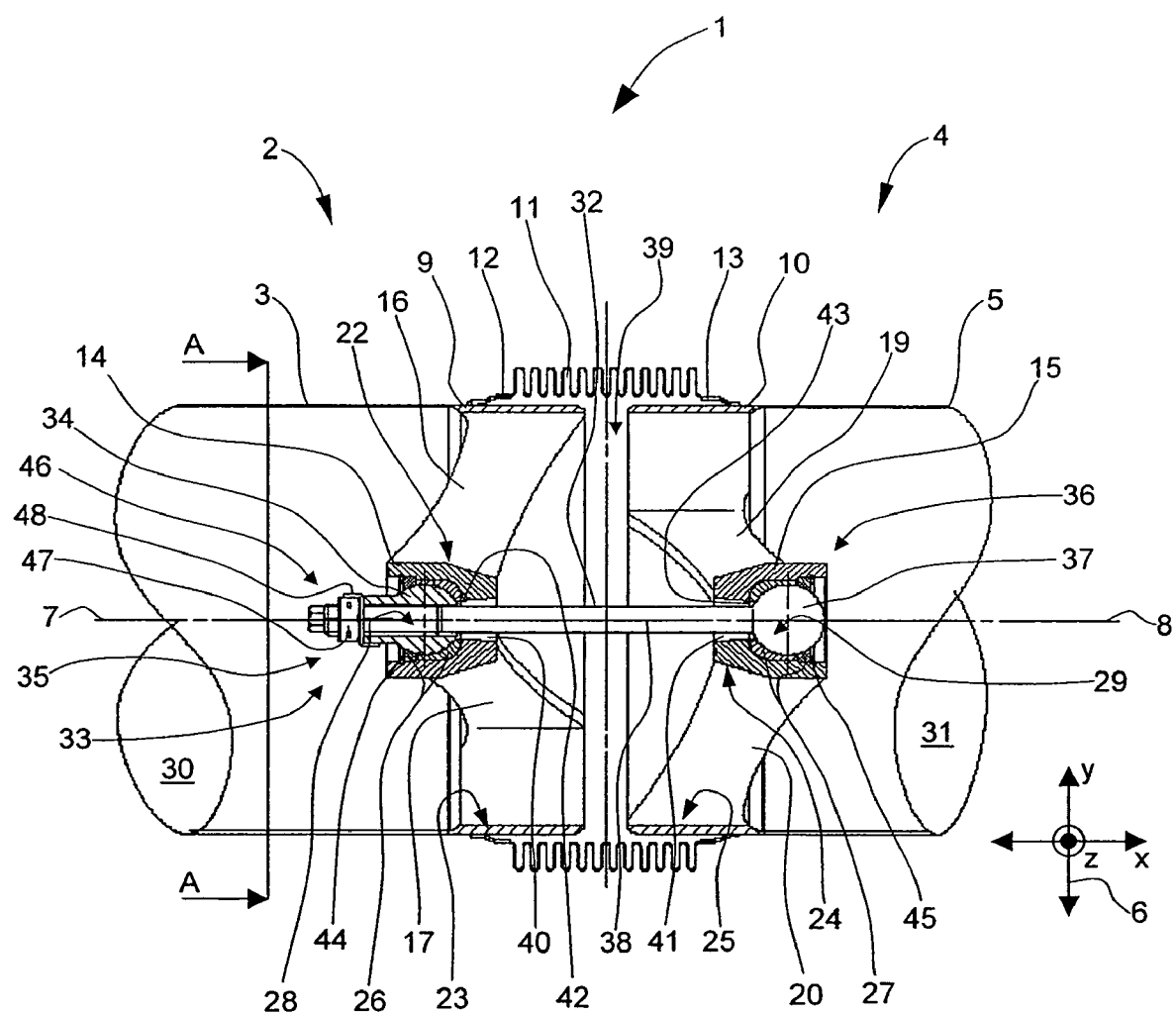
FIG. 1 a longitudinal section through the connector, and
FIG. 2 a cross section through the connector along the A-A cutting line.

FIG. 1 shows a longitudinal section through the connector according to the invention. Identical structural elements each are marked with the same reference numbers in the drawing.

The connector 1 articulately connects one pipe end 2 of a first pipeline 3 to a pipe end 4 of a second pipeline 5, allowing for tolerance compensation. A coordinate system 6 is shown to illustrate the spatial position of the x, y and z-axis. The first pipeline 3 and the second pipeline 5 here have longitudinal axes 7, 8. The connector 1 according to the invention initially enables an adjustable tolerance compensation, i.e. a length compensation between the first and second pipeline 3, 5 in the direction of the x-axis. In addition, the pipe ends 2, 4 can essentially move parallel to the y-axis and z-axis. Further, the connector 1 can be slightly kinked in the area of the metal bellows 11. The interaction between the described motion options makes it possible to articulately connect the first and second pipeline 3, 5 by the connector 1.

At the pipe end 2 of the first pipeline 3 a bearing ring 9 is arranged. A bearing ring 10 is correspondingly arranged at the pipe end 4 of the second pipeline 5. The bearing rings 9, 10 are rigidly connected with the pipe ends 2, 4, in particular welded gas tight to the pipelines 3, 5 by a continuous welded seam in the area of the pipe ends 2, 4. The pipe ends 2, 4 or the bearing rings 9, 10 are enveloped by a metal bellows 11 as a sealing unit. The metal bellows 11 has two continuous attachment flanges 12, 13, which are joined with the pipe ends 2, 4 or the bearing rings 9, 10 in a gas and pressure-tight manner by a continuous welded seam. The metal bellows 11 completely seals the connector 1 while simultaneously allowing high mobility or articulation.

Sealing units other than the metal bellows 11 can be provided. Depending on the temperature and/or pressure of the media to be conducted through the connector 1, for example, armored hoses or plastic bellows can be provided.

The bearing ring 9 comprises a receptacle 14, and the bearing ring 10 comprises a receptacle 15. The receptacles 14, 15 are essentially centrally arranged in the first and second pipeline 3, 5 relative to the longitudinal axes 7, 8. The receptacle 14 is connected with the bearing ring 9 by three braces 16, 17, 18, wherein the brace 18 is not shown on FIG. 1. The receptacle 15 is connected with the bearing ring 10 by three braces 19, 20, 21, wherein the brace 21 is also not shown on FIG. 1.

The braces 16, 17, 18 are uniformly distributed over a circumferential surface of an outer receptacle surface 22, pointing radially outward, and connected with a bearing ring inner surface 23 of the bearing ring 9. Accordingly, the braces 19, 20, 21 are uniformly distributed over a circumferential surface of an outer receptacle surface 24, pointing radially outward, and connected with a bearing ring inner surface 25 of the bearing ring 10.

The arrangement described above ensures an essentially central attachment of the receptacles 14, 15 in the area of the pipe ends 2, 4 of the pipelines 3, 5 relative to the longitudinal axes 7, 8, and hence a symmetrical force transmission.

To prevent the flow resistance in the pipeline through the connector 1 from reaching excessively high levels owing to the braces 16 to 21 and receptacles 14, 15, and allowing the transport of an overall still sufficient volumetric flow of a gaseous and/or fluid medium through the connector 1, the pipe diameter of the first and second pipeline 3, 5 to be connected should preferably measure more than 100 mm.

The receptacles 14, 15 incorporate two bearing shells 26, 27 in correspondingly designed depressions in the receptacles 14, 15. The dome-shaped opening 28 in the bearing shell 26 here points in the direction of an inner space 30 of the first pipeline 3, whereas the dome-shaped opening 29 of the bearing shell 27 points in the direction of an inner space 31 of the second pipeline 5. The bearing shells 26, 27 are made out of a material with a low kinetic friction factor, preferably with a metal material.

A tie rod 32 for connecting the bearing rings 9, 10 comprises a screw-on ball head 34 at a first end 33 as the adjusting unit 35 for adjusting the length parallel to the x-axis and assembling the connector 1, as well as a fixed ball head 37 at a second end 36. The tie rod 32 preferably having a roughly circular cross sectional geometry further comprises a longitudinal axis 38. In order that the screw-on ball head 34 can be screwed onto the tie rod 32, at least areas of the first end 33 of the tie rod 32 are provided with a thread for accommodating the screw-on ball head 34. At least areas of the fixed ball head 37 and screw-on ball head 34 are accommodated positively fitted in the dome-shaped openings 28, 29, yielding a hinged connection between the first and second pipeline 3, 5 with the formation of a gap 39. The dome-shaped openings 28, 29 here point in opposite directions, thereby transforming a separating movement of the pipe ends 2, 4 into a tensile force that can be effectively conveyed to the tie rod 32 via the ball heads 34, 37.

The receptacles 14, 15 comprise borehole 40 and 41 for passing through the tie rod 32. The boreholes 40, 41 are preferably conical, and have a distinctly greater minimum diameter on the sides facing the gap 39 than the outer diameter of the tie rod 32 to impart sufficient mobility to the tie rod 32 within the boreholes 40, 41 transverse to the x-axis. In the area of the bearing shells 26, 27, the boreholes 40, 41 are given a diameter that ensures a sufficient mobility of the tie rod 32. The bearing shells 26, 27 also comprise boreholes 42, 43 to pass through the tie rod 32, wherein the boreholes 42, 43 also have a diameter that ensures a sufficient mobility of the tie rod 32.

The screw-on ball head 34 and fixed ball head 37 are held in the dome-shaped openings 28, 29 by fastening elements 44, 45. The fastening elements 44, 45 are incorporated in correspondingly designed continuous recesses in the area of the depressions of the receptacles 14, 15. Possible fastening elements 44, 45 include lock washers, retaining rings and the like, which are placed in continuous grooves within the receptacles 14, 15. To ensure greater clarity in the drawing, the grooves are not provided with separate reference numbers.

When a pressurized medium is passed through the first and second pipeline 3, 5, the pipe ends 2, 4 with the bearing rings 9, 10 located therein are pulled apart, thereby exposing the tie rod 32 essentially only to tensile forces. These tensile forces can be transferred very effectively to the screw-on ball head 34 and the fixed ball head 37 of the tie rod 32 from the bearing shells 26, 27 with the dome-shaped openings 28, 29.

By contrast, if the tie rod 32 is exposed to compressive forces, the fastening elements 44, 45 prevent the fixed ball head 37 and screw-on ball head 34 from being forced out of the dome-shaped openings 28, 29 in the bearing shells 26, 27 as long as the compressive forces to be absorbed do not become too high.

It must here be noted that the connector 1 according to the invention is capable of absorbing considerably greater tensile forces in the direction of the x-axis than compressive forces acting in the opposite direction.

Basically, the tie rod 32 prevents essentially any noteworthy load from being placed on the metal bellows 11, both from tensile forces and compressive forces.

The connector 1 according to the invention essentially permits two potential motions between the first pipeline 3 and second pipeline 5.

The opposing pipe ends 2, 4 can initially each move relative to each other essentially parallel to a plane spanned from the y-axis and z-axis. The longitudinal axes 7, 8 here are essentially parallel to each other, while the longitudinal axis 38 of the tie rod 32 forms respective angles with the longitudinal axes 7, 8 of up to 15°.

In addition, the first and second pipeline 3, 5 can be "kinked" in the same or opposite directions in the area of the connector 1, so that both longitudinal axes 7, 8 each form angles of up to 15° relative to the longitudinal axis 38 of the tie rod 32. In this case, the longitudinal axes 7, 8 no longer run parallel to each other.

The maximum achievable angles depend in particular on the maximum diameter of the conical boreholes 40, 41 in the receptacles 14, 15, as well as on the flexibility of the metal bellows 11.

The gap 39 is always required to compensate for the relative motions of the pipe ends 2, 4 of the first and second pipeline 3, 5 relative to each other.

By correspondingly turning the ball head 34 that can be screwed onto the tie rod 32 not only the hinged connection between the first and second pipeline 3, 5 is possible, but also a length chance and hence a tolerance compensation for the connector 1 according to the invention 1 parallel to the x-axis.

A torsional motion between the first and second pipeline 3, 5 around the x-axis cannot be absorbed by the connector 1, since this motion would have to be absorbed solely by the metal bellows 11, which is not designed for this type of load exposure.

In order to prevent the screw-on ball head 34 from accidentally detaching from the tie rod 32, a safeguard 46 is also provided. In the depicted embodiment according to FIG. 1, the safeguard 46 is a counter-nut 47, which is additionally secured against twisting by a safety strap 48. Other safeguards, such as castellated nuts with safety splints, self-locking nuts or the like are also possible.

To mount the connector 1, the first pipeline 3 is designed to be separable in the area of the pipe end 2 by a V-flange joint (not shown). Both in the case of welded-on bearing rings 9, 10 and a welded-on metal bellows 11, this makes it possible to initially insert the tie rod 32 through the boreholes 41, 43 in the receptacle from behind with the ball head 34 screwed on, and then guide it through the boreholes 40, 42 in the receptacle 14. The bearing shells 26, 27 are already located in the receptacles 14, 15 in this stage of assembly.

The screw-on ball head 34 is then screwed onto the tie rod 32, and secured by the safeguard 46 to prevent accidental detachment once the desired width of the gap 39 has been reached to enable the articulately connection of the first and second pipeline 3, 5. The broader the scope of flexible motions to be executed, the wider the gap 39 should be. Finally, the fastening elements 44, 45 for locking the screw-on ball head 34 and fixed ball head 37 into the bearing shells 26, 27 are placed in the receptacles 14, 15 and/or the recesses located therein.

At the conclusion of the assembly process, the first pipeline 3 is sealed gastight again by means of the V-flange joint, and assembly ends. Other detachable pipe joints can be provided in place of the V-flange joint.

Figure 2:
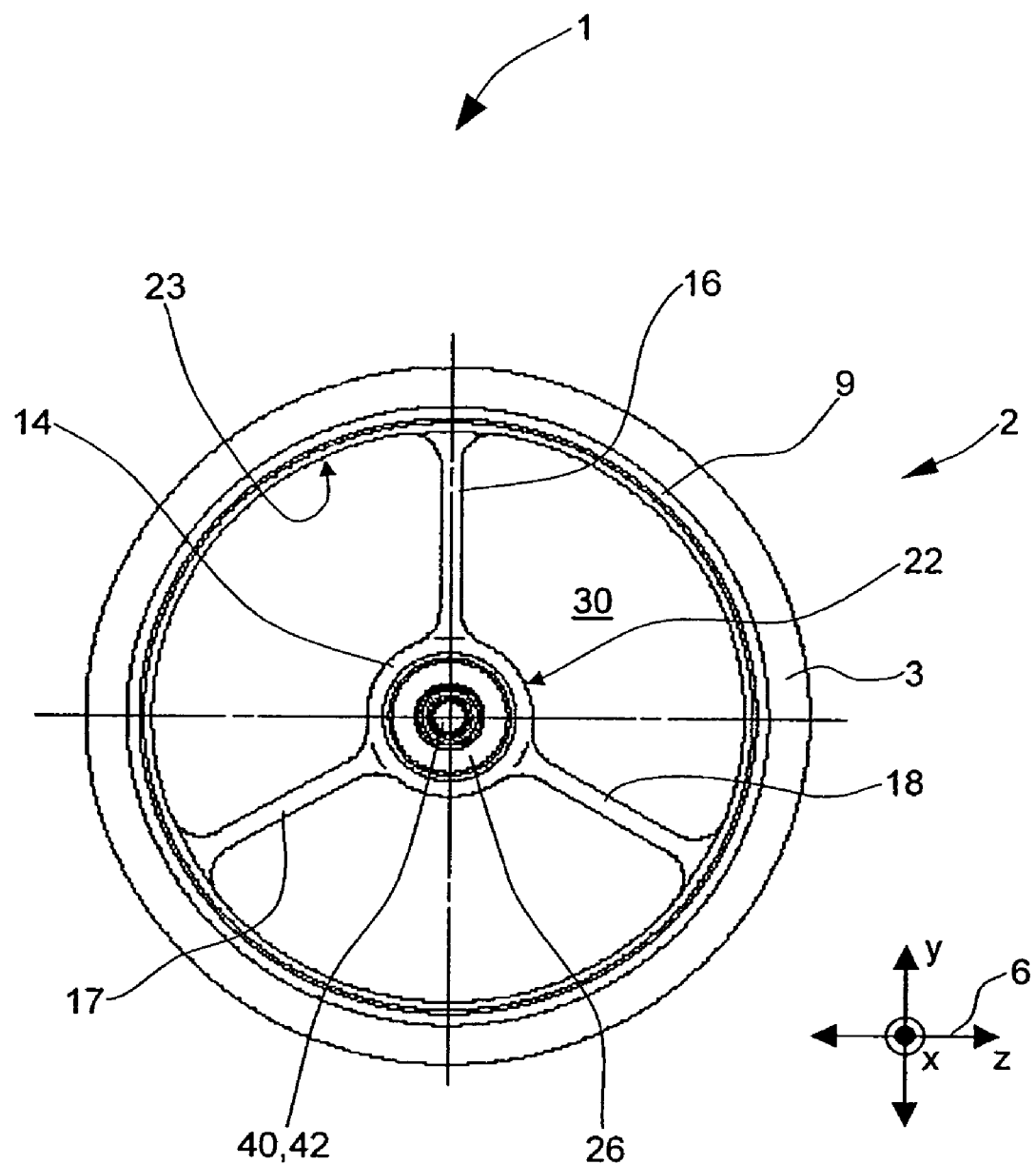

The symmetrical design of the tie rods 32 and receptacles 14, 15 makes it possible to install the tie rod in the connector rotated by 180° relative to the depiction on FIG. 2, so that the screw-on ball head 34 is located in the second receptacle 15. In this case, the V-flange joint is situated in the area of the second pipe end 4. Assembly then takes place proceeding from the receptacle 14 based on the sequence described above.

In addition, both pipe ends 2, 4 can have a separable V-flange joint to make assembly even easier and more flexible.

Using the metal bellows 11 as a sealing unit imparts an exceedingly long service life to the connector 1 according to the invention and makes it virtually maintenance-free, so that even pipelines with a plurality of connectors can be operated with a low probability of failure even in safety-relevant areas.

Because the adjusting unit 35 is arranged on the edge in the form of the ball head 34 that can be screwed onto the first end 33 of the tie rod in the area of the first bearing ring 9, the length of the tie rod 32 can be changed after separating the first pipeline 3 by the V-flange joint not shown on FIG. 1 by turning the screw-on ball head 34 after removing the safeguard 46, thereby easily enabling a tolerance compensation between the first and second pipeline 3, 5 in the direction of the x-axis.

FIG. 2 shows a cross section through the connector 1 along the cutting line A-A without the tie rod 32. The coordinate system 6 is used to illustrate the spatial position of the x-axis, the y-axis and the z-axis.

The receptacle 14 is essentially arranged centrally within the bearing ring 9 in the inner space 30 by the braces 16, 17 and 18. The braces 16, 17, 18 are uniformly distributed over the circumferential surface of the outer receptacle surface 22, pointing radially outward, and are connected with the bearing ring inner surface 23. Accordingly, the braces 16, 17, 18 are uniformly distributed over the circumference of the bearing ring inner surface 23. The centric positioning of the receptacle 14 in the bearing ring 9 and/or in the pipe end 2 of the first pipeline 3 ensures a symmetrical transfer of force between the pipe ends 2, 4.

The bearing rings 9, 10 along with the receptacles 14, 15 secured therein by the braces 16 to 21 are preferably of integral design, e.g., fabricated in a casting process. As an alternative, the bearing rings 9, 10 can also be joined with the braces 16 to 21 as well as the receptacles 14, 15 via known bonding processes, e.g., through welding, riveting or the like.

The bearing ring 9 is connected with the pipeline 3 by a continuous gas and pressure-tight weld seam. The bearing shell 26 is incorporated in a corresponding recess in the receptacle 14. The receptacle 14 preferably comprises a conical borehole 40 for passing through the tie rod 32. The borehole 42 is introduced into the bearing shell 26 for passing through the tie rod 32.

The structural design of the bearing ring 10, in particular the central arrangement of the receptacle 15 and braces 19, 20, 21, corresponds to the structural design of the bearing ring 9 described above.

The connector 1 according to the invention is primarily suitable for articulately connecting pipelines 3, 5 used to relay fluids and/or gases with a high pressure and/or a high temperature. The connector 1 is particularly suitable for routing-through hot air, liquids of all kinds, water vapor or the like. In addition, the connector 1 enables an easy tolerance compensation between the pipelines 3, 5 by an easily actuated adjusting unit 35 situated on the edge. In addition, the connector 1 is easy to assemble and inspect.

In particular, the connector 1 is provided for connecting pipelines 3, 5 of an engine-powered hot air supply system in aircraft, wherein temperatures of up to 850° C. and pressures of up to 20 bar are possible for the connector 1 as a function of the used material.

In pipelines for engine-powered hot air supply systems in aircraft, the air usually reaches temperatures of up to 360° C. at a pressure of up to 16 bar, making the connector 1 very well suited for manufacturing connections between such pipelines. Titanium and/or steel are preferably used as the material for the partial components of the connector 1.

The connector 1 according to the invention is able to absorb tensile forces of up to 20,000 N and compressive forces of up to 2,000 N parallel to the x-axis. The pipelines 3, 5 to be joined here preferably have a diameter exceeding 100 mm. In addition to the above, other applications are also conceivable, for example in power plant engineering, the chemical industry, Laundromat engineering, medical technology or the like.

The first and second pipeline 3, 5, the bearing rings 9, with the braces 16 to 21 along with the metal bellows 11 are preferably made out of a metal material, in particular titanium. By contrast, the tie rod 32 with the fixed ball head 37 and the screw-on ball head 34 are preferably made out of steel.

As an alternative and depending on the temperature and pressure of the media to be passed through, the partial components of the connector 1 can also be made out of high-grade steel, aluminum alloys that can adequately withstand thermal and mechanical loads, as well as thermostable steel alloys. It is here not absolutely necessary that all partial components of the connector 1 be made out of the same materials.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

REFERENCE LIST

Connector
Pipe end (first pipeline)
First pipeline
Pipe end (second pipeline)
Second pipeline
Coordinate system
Longitudinal axis
Longitudinal axis
Bearing ring
Bearing ring
Metal bellows
Fastening flange
Fastening flange
Receptacle
Receptacle
Brace
Brace
Brace
Brace
Brace
Brace
Receptacle outer surface
Bearing ring inner surface
Receptacle outer surface
Bearing ring inner surface
Bearing shell
Bearing shell
Dome-shaped opening
Dome-shaped opening
Inner space (first pipeline)
Inner space (second pipeline)
Tie rod
First end
Screw-on ball head
Adjusting unit
Second end
Fixed ball head
Longitudinal axis
Gap
Borehole (receptacle)
Borehole (receptacle)
Borehole (bearing shell)
Borehole (bearing shell)
Fastening means
Fastening means
Safeguard
Counter-nut
Safety strap

The invention claimed is:

1. A connector with an additional tolerance compensation capacity for articulately connecting a first and second pipeline of an engine-powered hot air supply system in an aircraft,
wherein one pipe end of the first pipeline is articulately connected by a tie rod with a pipe end of the second pipeline with the formation of a gap,
wherein the pipe ends each comprise a bearing ring incorporating an essentially centrically arranged receptacle for attaching the tie rod;
wherein the receptacle is connected with a bearing ring inner surface by at least two braces pointing radially outward;
wherein the opposing pipe ends are enveloped by a sealing unit for sealing the gap, and a first end of the tie rod comprises an adjusting unit for length adjustment; and
wherein the tie rod comprises a screw-on ball head as the adjusting unit at the first end, and a fixed ball head at a second end.

2. The connector according to claim 1, wherein the braces are spaced uniformly apart.

3. The connector according to claim 1, wherein the receptacles each include a bearing shell having a dome-shaped opening that points in the direction of an inner space of the first and second pipeline, respectively.

4. The connector according to claim 3, wherein the bearing shells and the receptacles each have boreholes for passing through the tie rod.

5. The connector according to claim 3, wherein the bearing shells are supportable in the receptacles by fastening elements.

6. The connector according to claim 1, wherein the first pipeline and/or the second pipeline are designed to be separable in the area of the bearing ring.

7. The connector according to claim 1, wherein the receptacles each include a bearing shell, wherein at least areas of the screw-on ball head and fixed ball head are placeable form-locking in the bearing shells in order to articulately connect the first and second pipeline.

8. The connector according to claim 1, wherein the screw-on ball head is secured by a safeguard at the first end of the tie rod to prevent accidental detachment.

9. The connector according to claim 8, wherein the safeguard is a counter-nut and is additionally secured against twisting by a safety strap.

10. The connector according to claim 1, wherein the first and second pipeline, the bearing rings with the receptacles, the tie rod along with the sealing unit are made out of a metal material.

11. The connector according to claim 1, wherein the sealing unit is a metal bellows.

12. The connector according to claim 11, wherein the metal bellows has two continuous attachment flanges, which are joined with the pipe ends or the bearing rings in a gas and pressure-tight manner by a continuous welded seam.

13. A connector with an additional tolerance compensation capacity for articulately connecting a first and second pipeline of an engine-powered hot air supply system in an aircraft;

wherein one pipe end of the first pipeline is articulately connected by a tie rod with a pipe end of the second pipeline with the formation of a gap;

wherein the opposing pipe ends are enveloped by a sealing unit for sealing the gap, and a first end of the tie rod comprises an adjusting unit for length adjustment;

wherein the tie rod comprises a screw-on ball head as the adjusting unit at the first end, and a fixed ball head at a second end;

wherein the receptacles each include a bearing shell; and, wherein at least areas of the screw-on ball head and fixed ball head are placeable form-locking in the bearing shells in order to articulately connect the first and second pipeline.

* * * * *